Nov. 11, 1930.  E. A. FERRIS  1,781,220
DEVICE FOR CONTROLLING THE TRAVEL OF TONG DOGS FOR SAWMILL CARRIAGES
Filed June 18, 1928  3 Sheets-Sheet 1
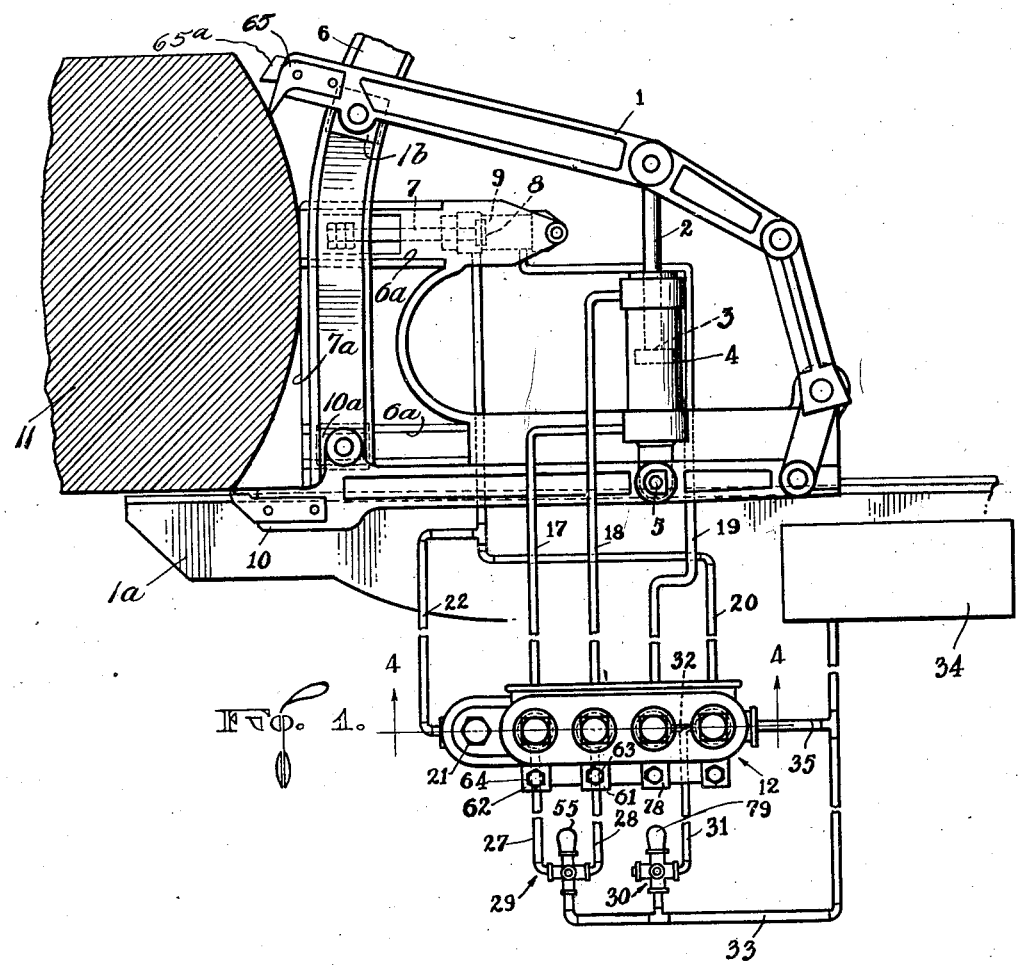
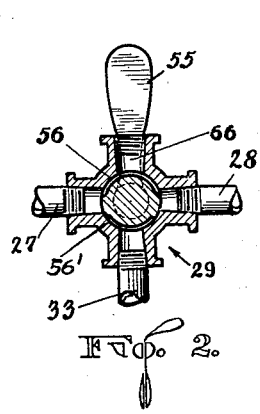
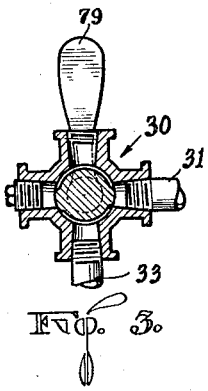
INVENTOR.
ERVIE A. FERRIS.
BY Munn & Co.
ATTORNEYS.

Nov. 11, 1930.  E. A. FERRIS  1,781,220
DEVICE FOR CONTROLLING THE TRAVEL OF TONG DOGS FOR SAWMILL CARRIAGES
Filed June 18, 1928   3 Sheets-Sheet 2
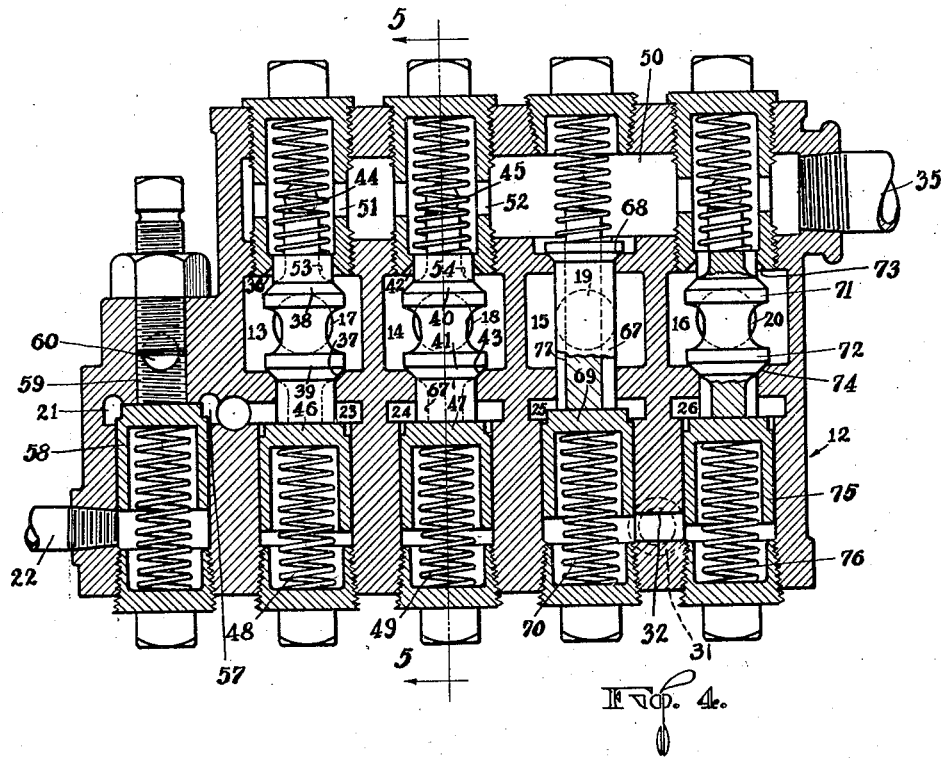
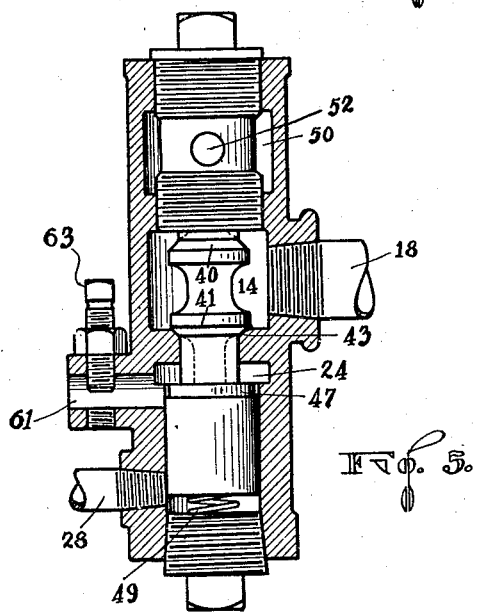
INVENTOR.
ERVIE A. FERRIS.
BY Munn & Co.
ATTORNEYS.

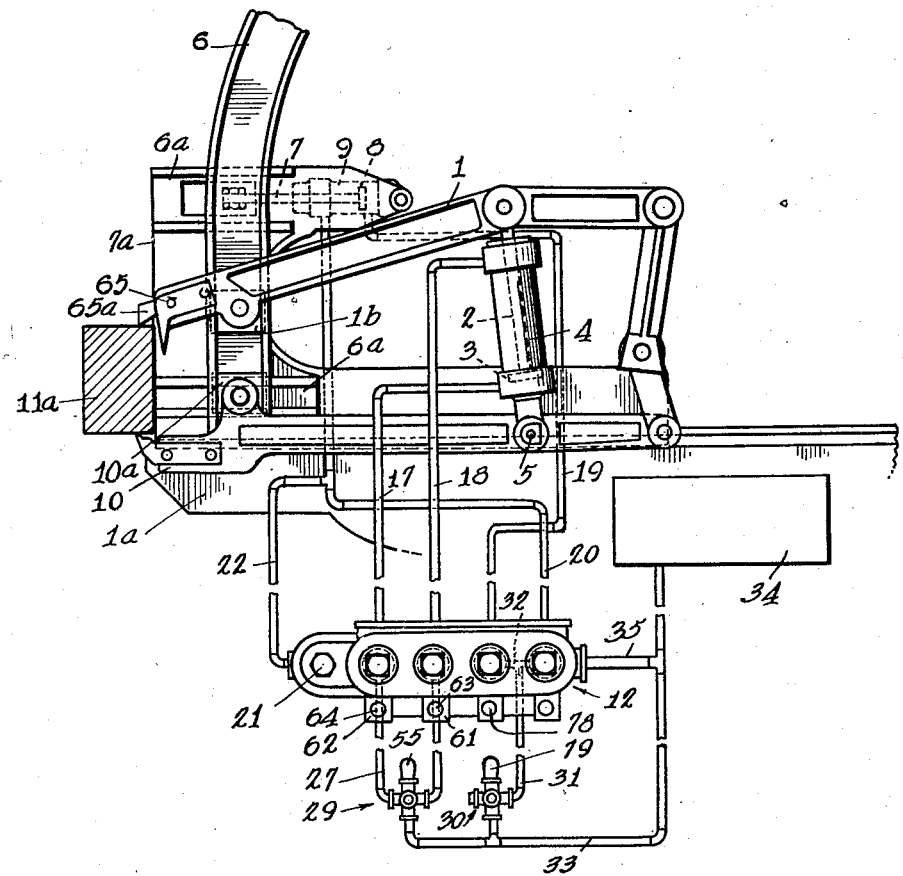

Patented Nov. 11, 1930

1,781,220

UNITED STATES PATENT OFFICE

ERVIE A. FERRIS, OF WESTWOOD, CALIFORNIA

DEVICE FOR CONTROLLING THE TRAVEL OF TONG DOGS FOR SAWMILL CARRIAGES

Application filed June 18, 1928. Serial No. 286,399.

My invention relates to improvements in devices for controlling the travel of tong dogs for saw mill carriages, and it consists in the combinations, constructions, and arrangements hereinafter described and claimed.

Tong dogs must have power enough to drive the dog points into a round log for securely holding it. At the same time when the dogs are used on square edge cants they naturally have the same power, and this power is so great that when the dog points strike about one inch from the edge of the cant they often bite out the corners, causing considerable damage to the lumber. Furthermore, in the devices now in use it is necessary to move the top hammer dogs of the tong dogs entirely to the upper end of their travel before they can again be brought down into engagement with the log or cant. This takes considerable time, and causes unnecessary delay.

The purpose of the present invention is to provide a device for controlling tong dogs which will exert the necessary force required to drive the dog points into the log, yet this force may be controlled for causing the dogs to exert less force when engaging with a cant, thus eliminating any possibility of the dogs biting a large sliver out of the cant. The tong dog controlling means causes them to move slowly into engagement with the cant, and then after engagement to increase their force to equal that at which they engage with a round log. This additional force will not break the cant because the dogs have already come to rest thereupon prior to the increasing of the force.

A further object of my invention is to provide a device of the type described which makes use of novel means for permitting the tong dogs to be raised or lowered to any desired point and then be changed in their direction of travel at any desired point, thus obviating the necessity of causing the top log dog to raise to its uppermost position before it again starts on its downward travel.

A further object of my invention is to provide an automatic means for slowing up the downward movement of the upper dog into engagement with the work when the stanchion has been moved back preparatory to receiving a cant. The tong dogs are operated by an operating valve located on each knee. Each operating valve is controlled by a control valve located in a central point and operated by one man.

Other objects and advantages will appear in the following specification, and the novel features of the device will be particularly pointed out in what I hereinafter claim.

My invention is illustrated in the accompanying drawings forming a part of this application, in which Figure 1 is a diagrammatic showing of the tong dogs and an operating valve for regulating the movements of the dogs, the dogs receiving a log;

Figures 2 and 3 are sectional views of remote control valves;

Figure 4 is a vertical section through the operating valve on line 4—4 of Figure 1;

Figure 5 is a section along the line 5—5 of Figure 4; and

Figure 6 is similar to Figure 1, but shows the tong dogs drawn back for receiving a cant.

In carrying out my invention, I make use of a hammer or top dog 1 mounted upon a saw mill carriage 1ª, this dog being raised and lowered by means of a piston rod 2 that in turn is connected to a piston 3. The piston is mounted in a cylinder 4 that has a pivotal mounting at 5 with a lower dog 10. A stanchion 6 has a channel for slidably receiving blocks 1ᵇ and 10ª, carried by the tong dogs, and is moved forward or backward, in guides 6ª by means of a piston rod 7 that carries a piston 8 mounted in a cylinder 9. The dog 1 cooperates with the dog 10 for holding a log 11, see Figure 1, or a cant 11ª, see Figure 6. The moving of the stanchion with respect to the knee 7ª moves the tong dog points toward or away from the face of the knee.

An operating valve indicated generally at 12 has a plurality of large cylinders 13, 14, 15 and 16, shown in Figure 4 connected to the cylinders 4 and 9 by pipes. Pipe 17 connects cylinder 13 with the bottom of cylinder 4, while pipe 18 connects cylinder 14 with the top of cylinder 4. Pipe 19 connects cylinder 15 with the back of cylinder 9, and pipe 20 connects cylinder 16 with the front of cylinder 9. In addition, I show what I term a retard cylinder 21 that is placed in communication with the pipe 20 by means of a pipe 22 (see Figure 1).

Valves mounted in the cylinders 13 to 16 inclusive are controlled by pilot cylinders 23, 24, 25 and 26. Pipes 27 and 28 connect the pilot cylinders 23 and 24 to a remote control valve indicated generally at 29, this valve being shown in detail in Figure 2. A second remote control valve indicated generally at 30 is connected by means of a pipe 31 to the pilot cylinders 25 and 26. Figure 1 shows how the pipe 31 communicates with a passage 32 in the valve 12, and how this passage divides into two branches, these branches communicating with the pilot cylinders 25 and 26. An enlarged sectional detail of valve 30 is shown in Figure 3.

The valves 29 and 30 are connected by a pipe 33 to an air storage tank 34. A pipe 35 taps the pipe 33 and conveys air to the cylinders 13 to 16 inclusive when the valves in these cylinders are in certain positions.

It is best now to describe the action of valves in the cylinders 13 and 14 for controlling the piston rod 2. Cylinder 13 is provided with a valve seat 36, (see Figure 4) and a valve seat 37. Valves 38 and 39 are integrally connected to each other and intermittently seat, that is, when the valve 38 is seated the valve 39 is not, and vice versa. In like manner valves 40 and 41 are integrally connected to each other, and are mounted in cylinder 14 and adapted to seat against valve seats 42 and 43 respectively. The valves 39 and 41 are normally kept closed by the air pressure in cylinders 13 and 14, but springs 44 and 45 insure a quick and positive closing.

The lower ends of the valves 39 and 41 bear against pistons 46 and 47 respectively. These pistons are mounted in cylinders 23 and 24 and are urged against the bottoms of the valve guides by springs 48 and 49 respectively. These springs are weaker than the springs 44 and 45, so that normally the parts will remain in the position shown in Figure 4. The operating valve casing 12 has a passageway 50 therein for conducting air flowing from the pipe 35. This air passes through openings 51 and 52. The valves 38 and 40 have air-conveying grooves 53 and 54 therein for permitting air to flow from the passageway 50 into the cylinders 13 and 14. The pipes 17 and 18 communicate with the cylinder, and therefore the air will flow through these pipes and be carried into the cylinder 4. Since the pressure of air in the pipes 17 and 18 is equal, an equal force will be exerted against both sides of the piston 3, and this will maintain the piston in a fixed position.

If the operator wishes to move the piston up or down, he merely exhausts air from above the piston or from beneath it, and permits additional air to enter the cylinder on the opposite side from that in which it is exhausting. This will cause a movement of the piston and in turn will move the dog 1. The remote control valve 29 is used for controlling the piston 3. This valve has a handle 55 which, when swung to the right in Figure 2, brings a passageway 56' into registration with the air supply pipe 33 and the pipe 27.

It should be noted at this point that the valve 29 may be placed any distance from the operating valve, and that this valve in turn can be placed any distance from the tong dogs 1 and 10 and their associate parts. It is convenient to mount the operating valve on the knee 7ª of the device.

A movement of the handle 55 to the right causes air to flow through the pipe 27 and into the pilot cylinder 23. A sectional view shown in Figure 5 illustrates the point at which the pipe 28 enters the pilot cylinder 24. The pipe 27 enters the cylinder 23 in a similar manner. The air forces the piston 46 upwardly, and this in turn seats the valve 38 and opens the valve 39. Air ceases to flow from the passageway 50 into the pipe 17, but instead the pipe 17 empties its air into the cylinder 13 and the air flows past the open valve 39 into the pilot cylinder 23, through a passageway 57, across the top of a piston 58 in the retard cylinder 21 (this piston being in its lowermost position during this operation instead of in its uppermost position as illustrated) up through a bore 59 and out through the exhaust ports 60. Figure 5 shows the cylinder 24 as being provided with an exhaust port 61. The cylinder 23 is provided with a similar exhaust port, this being shown at 62 in Figure 1. An adjustable plug 63 controls the flow of air out through the port 61, and a similar plug 64 controls the flow of air out through the exhaust port 62. A portion of the air flowing from pipe 17 through cylinder 13 and on to exhaust port 60, passes through the port 62. In this way two exhaust ports are provided, and the air will be permitted to quickly pass through the pipe 17 to drain the air from the cylinder 4 directly beneath the piston 3 and to permit the piston to move downwardly quickly.

The exhaust of air from beneath the piston 3 is caused by the flow of air through the pipe 18 to a position above the piston 3. It should be remembered that during the time the valve 38 is seated and the valve 39 is unseated, the valves 40 and 41 remain in the same position shown in Figure 4. Air will therefore flow through openings 52, grooves 54, cylinder 14, pipe 18, and into the top of the cylinder 4.

I have described how a movement of the handle 55 to the right will cause the dog 1 to move downwardly with a force sufficient to drive the dog point 65 into a log. The dog can be reversed in its movement, that is, be moved upwardly, this being accomplished by a mere swinging of the handle 55 to the left from the neutral position shown in Figure 2. This will direct air through the pipe 28 into the pilot cylinder 24, which will seat the valve 40 and open the valve 41. The rocking of the handle 55 to the left places the pipe 27 in communication with an exhaust port 66, and this permits the air to drain from the pilot cylinder 23 and to allow the valve 39 to seat and the valve 38 to open. The flow of air through the cylinders 13 and 14 will now be reversed. The cylinder 14 will exhaust air from the top of the cylinder 4, this air passing through grooves 67′ into the pilot cylinder 24, and thence out through the exhaust port 61. Air will enter the pipe 17 and will fill the lower part of the cylinder 4 to raise the piston 3.

The piston can be stopped in any position desired by merely swinging the handle 55 back into neutral position as shown in Figure 2. This places both pipes 27 and 28 in communication with the exhaust 66, permits valves 39 and 41 to seat, and causes an equal pressure of air to enter pipes 17 and 18.

When the tong dogs 1 and 10 receive a cant 11ª instead of a log 11, the stanchion 6 is moved back, see Figure 6. This is accomplished by moving the piston 8 within the cylinder 9, and this movement in turn is controlled by the valves in the cylinders 15 and 16, see Figure 4, and the remote control valve 30, see Figure 3. The cylinder 15 has a valve 67 mounted therein which is adapted to seat against a valve seat 68. A piston 69 mounted in the pilot cylinder 25 bears against the shank of the valve 67 and is held against the shank by a spring 70. Valves 71 and 72 are connected to each other and are mounted in the cylinder 16. Valve seats 73 and 74 are provided for the valves 71 and 72 respectively. A piston 75 bears against the shank of the valve 72 and is yieldingly held in position by means of a spring 76.

It will be noted from the constructions of the valves 67, 71 and 72 that air in the passageway 50 will keep the valves 68 and 72 seated and the valve 71 open. Air will normally flow past the valve 71 and through the pipe 20 to move the piston 8 toward the right in Figure 1. This will exhaust the air from the right hand end of the cylinder 9, and this air will be forced through the pipe 19 into the cylinder 15, through a groove 77 in the valve shank 67, thence into the cylinder 25 and out through the exhaust port 78, see Figure 1, this port being similar to the port 61 shown in Figure 5. The piston 8 will therefore be at the extreme right end of its stroke when looking at Figure 5 when a handle 79 of the valve 30 is in vertical position as shown in Figure 3.

If now the handle 79 is swung to the left, it will place the pipe 33 in communication with the pipe 31, and this will raise both the pilot pistons 69 and 75, opening the valves 68 and 72 and closing the valve 71. The passage of air to the cylinder 9 will now be reversed, air flowing through the pipe 19 into the cylinder and through the pipe 20 away from the cylinder. This causes the piston 8 to move to the extreme left hand position and to carry the stanchion 6 therewith.

It should be noted at this point that when the piston 8 is at the extreme right of its stroke, see Figure 6, the stanchion 6 is pulled back for positioning the dogs for receiving the cant 11ª. It is necessary to cut down the force exerted upon the hammer dog 1 and to cut down the speed of the dog as it is lowered into engagement with the cant in order to prevent the dog from biting a sliver out of the cant. I accomplish this retarding movement of the dog 1 automatically in the following manner. When the valves 68, 71 and 72 are in the positions shown in Figure 4, the piston 8 will be at its extreme right hand position as shown in Figure 6. A portion of the air flowing through the pipe 20 into the left hand end of the cylinder 9 is directed through the pipe 22, see Figure 1, into the retard cylinder 21. The cylinder 21 is shown in Figure 4. The air flowing from the pipe 22 raises the piston 58 into the position shown in Figure 4. This cuts off any escape of air from the pilot cylinder 23 through the exhaust openings 60. Air flows through the cylinder 23 only when the dog 1 is being moved downwardly. All of the air flowing from beneath the piston 3 in the cylinder 4 will therefore have to flow through the exhaust port 62. The passage of air through this port is slowed down to the desired extent so as to cause the dog 1 to be lowered slowly. The dog will therefore engage with the cant gently so as to not tear a piece therefrom. A shorter dog point 65ª engages with the cant instead of the point 65. Of course the air will continue to leak through the port 62 after the dog 1 has engaged with the cant until there is no air pressure beneath the piston 3. This operation causes a gradual increase of force to be applied to the dog 1 after it engages with the cant. The dog will therefore have sufficient force to hold the cant rigidly in position even though the dog was slowly brought into engagement with the cant.

From the foregoing description of the various parts of the device, the operation thereof will be readily understood.

When the saw mill receives a new log, the operator throws the handle 79 to the right, see Figure 3, this causing pistons 69 and 75 to move valves 68, 71 and 72 and to admit air to the back of the cylinder 9 and to permit it to exhaust from the front of the cylinder. This moves the stanchion forwardly. The operator can now actuate the handle 55 to the left, see Figure 2, which causes the piston 47 to close the valve 40 and to open the valve 41, thus permitting air to enter the bottom of the cylinder 4 through the pipe 17 and to escape from the top of the cylinder. This raises the dog 1. The upward movement of the dog can be stopped at any point by the operator throwing the handle 55 into neutral position, which causes the valves 38, 39, 40 and 41 to assume the positions shown in Figure 4 and to admit air to the top and bottom of the cylinder 4, thus creating a perfect balance upon the piston 3. When the log is received, the dog 1 can be brought down into engagement with the log. This is accomplished by throwing the handle 55 to the right, see Figure 2. This closes the valve 38 and opens the valve 39 and permits air to exhaust from beneath the piston 3 and flow out through the pipe 17. Air is being fed into the top of the cylinder 4, and has sufficient force to swing the dog 1 into engagement with the log. During this movement the air flowing through the pipe 17 exhausts through the port 62 and port 60.

Now when the log has been sawed on three sides and is turned the last time, the dogs 1 and 10 have to be drawn back to within about one inch from the face of the knee 7ª to allow the cant 11ª to be sawed up to the last plank.

It is obvious that if the upper dog arm descended with the same velocity that is required to hold a round log, it would likely bite off a long sliver out of the corner of the cant. The purpose of the retarding cylinder 21 is to cut down the speed of the movement of the dog 1. As heretofore stated, the piston 58 in the retard cylinder 21 is raised when the handle 79 of the valve 30 shown in Figure 3 is swung into vertical position. This permits air to exhaust from beneath the piston 3 through the small port 62 instead of through this port and the port 60. The retard cylinder cuts off port 60. The slow exhaust of air from beneath the piston 3 causes the dog 1 to move downwardly slowly.

Although I have shown and described one embodiment of my invention, it is to be understood that the same is susceptible of various changes, and I reserve the right to employ such changes as may come within the scope of the appended claims.

I claim:

1. The combination with a saw mill carriage having a log or cant receiving knee, of a dog, means for moving the dog in a vertical plane in either direction and for holding it in adjusted position, a stanchion slidable toward and from the face of the knee, and carrying the dog therewith, means for moving said stanchion in either of said directions, said means cooperating with said first named means for retarding the downward movement of said dog when said stanchion is in a retracted position.

2. The combination with a saw mill carriage having a log or cant receiving knee, of a dog, a cylinder, a piston mounted in said cylinder and being operatively connected to said dog for moving it in a vertical plane, means for controlling the flow of air into the top and bottom of the cylinder for moving the piston in either direction or for holding the piston in adjusted positions, a stanchion slidable toward and from the face of the knee and carrying the dog therewith, means for moving said stanchion in either of said directions, said means cutting down the escape of air from beneath said piston for retarding the downward movement of said dog when said stanchion is in retracted position.

3. The combination with a saw mill carriage having a log or cant receiving knee, of a dog, a piston and a cylinder for said dog for moving it in a vertical plane, a stanchion slidable toward and from the face of the knee, a piston and cylinder for moving said stanchion, an operating valve for directing air into either of said cylinders for moving said pistons in either direction, and remote control valves for controlling the operating valve, a retard cylinder forming a part of said operating control valve, said retard cylinder cutting off a portion of the exhaust opening from the cylinder connected to the dog when the remote control valve for the stanchion cylinder is actuated, whereby the downward movement of the dog is retarded.

4. A saw mill carriage comprising a log or cant receiving knee, a dog for engaging with the log or a cant, means for moving the dog in a vertical plane in either direction and for holding it in adjusted position, and means for moving the dog toward and from the face of the knee, said last named means, when moving said dog to retracted position, cooperating with said first named means for retarding the downward movement of said dog.

5. A saw mill carriage having a log or cant receiving knee, tong dogs for engaging with the log or cant, means for moving the dogs in a vertical plane in either direction and for holding them in adjusted positions, and means for moving the dogs toward and from the face of the knee, said last named means when moving said dog to retracted position cooperating with said first named means for retarding the movement of said dogs toward each other.

6. A saw mill carriage having a log or cant receiving knee, a stanchion movable toward and away from the face of the knee, tong dogs slidably carried by said stanchion and being movable in a vertical plane, means for moving said dogs and means for retarding the downward movement of the upper dog, said last named means being automatically brought into play when said stanchion is moved into retracted position.

7. A saw mill carriage having a log or cant receiving knee, a stanchion, pneumatic means for moving said stanchion toward or away from the face of said knee, tong dogs slidably carried by said stanchion and being movable in a vertical plane, pneumatic means for moving said dogs toward and away from each other, and pneumatically controlled means automatically brought into play upon the retracting of said stanchion for retarding the exhaust of air from said dog moving means for causing the upper dog to move slowly into engagement with the work.

ERVIE A. FERRIS.